United States Patent [19]

Graff et al.

[11] 4,253,861

[45] Mar. 3, 1981

[54] METHOD OF COPPER STAINING A GLASS ARTICLE

[75] Inventors: William A. Graff, Willoughby; Robert D. Shelley, Chesterland, both of Ohio

[73] Assignee: General Electric Company, Schenectady, N.Y.

[21] Appl. No.: 113,646

[22] Filed: Jan. 21, 1980

Related U.S. Application Data

[63] Continuation-in-part of Ser. No. 924,017, Jul. 12, 1978, abandoned, which is a continuation-in-part of Ser. No. 823,978, Aug. 12, 1977, abandoned.

[51] Int. Cl.³ ............................................. C03C 21/00
[52] U.S. Cl. ........................................ 65/30 E; 65/32; 427/163; 427/255.4
[58] Field of Search ................. 65/30 E, 30 R, 31, 32, 65/60 R, 60 C; 427/255, 377, 163, 165–169, 255.4

[56] References Cited

U.S. PATENT DOCUMENTS

| | | | |
|---|---|---|---|
| 2,075,446 | 3/1937 | Leibig | 65/30 E X |
| 2,428,600 | 10/1947 | Williams | 65/30 R |
| 3,420,698 | 1/1969 | Smith | 65/30 E X |
| 3,424,567 | 1/1969 | Smith | 65/30 E |
| 3,429,742 | 2/1969 | Grego et al. | 65/30 E X |
| 3,846,095 | 11/1974 | Crouch | 48/196 R |
| 3,997,312 | 12/1976 | Besselink | 65/30 E |

OTHER PUBLICATIONS

Weyl, "Coloured Glasses", Society of Glass Technology, (1951), pp. 433–435.

*Primary Examiner*—Morris Kaplan
*Attorney, Agent, or Firm*—John F. McDevitt; Lawrence R. Kempton; Philip L. Schlamp

[57] ABSTRACT

Copper staining of a borosilicate glass article is described which utilizes a single heating step to produce red coloration in the stained glass. The method utilizes a particular liquid slurry to coat the surface of the glass article being treated which generates copper halide vapors during a single heating step in a controlled atmosphere to produce the desired final red color. Atmosphere control is exercised with non-reducing atmosphere conditions being maintained until the alkali metal ions in the glass surface have been replaced with copper ions and which is followed by conversion to reducing atmosphere conditions to convert the substituted copper ions to the metallic state.

5 Claims, No Drawings

METHOD OF COPPER STAINING A GLASS ARTICLE

This application is a now abandoned continuation-in-part of application Ser. No. 924,017, filed July 12, 1978, as a continuation-in-part of originally filed and now abandoned application Ser. No. 823,978, filed Aug. 12, 1977.

BACKGROUND OF THE INVENTION

A general technique of red staining borosilicate glasses wherein copper ions obtained from copper halide vapors are substituted for alkali metal ions in the glass and thereafter converted to metallic copper imparting a red color has been known for many years. The historical treatment of this development activity appears in Chapter XXVII of the textbook entitled "COLOURED GLASSES" by W. A. Weyl, Society of Glass Technology, 1951, which includes reference to the process of reacting copper halide vapors with the glass surface for ion replacement of the alkali ions by copper ions. All of said references utilize a double firing technique for the desired color production, however, and which can further include still additional firing steps to produce the proper color brightness or intensity.

It would be beneficial if such general process of staining borosilicate glass articles to produce red coloration could be improved to eliminate multiple firing steps. It would also be desirable from a cost standpoint to eliminate the need for silver ions in the staining composition which serve as nucleating agent for copper staining a borosilicate glass in the conventional manner. Said conventional staining process provides only yellow coloration to the glass after initial firing in air which produces migration of copper and silver ions from the staining composition to exchange for alkali metal ions in the glass. A second heating step conducted under reducing atmosphere conditions is required by said conventional staining process to reduce the coloring ions to atoms and thereby produce darker coloration in the glass. The coating originally applied to the glass article to produce said stain is also generally removed before the second heating step in order to provide better results.

It is a principle object of the present invention, therefore, to provide an improved method for copper red staining borosilicate glass which utilizes but a single heating step in achieving the desired red color. Another important object of the present invention is to provide an improved method for copper red staining of borosilicate glass which further requires but a single cleaning step to remove residual process materials from the treated glassware.

SUMMARY OF THE INVENTION

It has now been discovered, surprisingly, that a single step firing treatment can be used to impart a desired copper red stain of borosilicate glass by precoating the glass surface with a solid mixture containing a cuprous halide, a cupric salt, and a particulated inorganic binder which is thereafter heated at elevated temperatures in a particular atmosphere to produce the desired red color stain directly. The coating material is deposited on the glass surface from a liquid slurry which preferably contains the selected cuprous halide salt dispersed in an inert solvent such as alcohol. Generally, the present improved method of copper staining of borosilicate glass articles comprises:

(a) coating the surface of said glass article with the liquid slurry containing a cuprous halide salt, a cupric salt, together with a particulated inorganic binder, and (b) heating the coated glass article to elevated temperatures from approximately 500° C. to 700° C. in a gaseous atmosphere which is converted without interruption from a non-reducing condition to a reducing condition for a sufficient time period to produce the desired red color.

A useful cuprous halide salt to generate the needed metal ions for exchange with the alkali metal ions in the glass surface is cuprous chloride. The presence of a higher valence cupric salt in the coating composition provides needed cooperation during the ion exchange process of maintaining the accompanying cuprous ion in its lower valence state. The particulated inorganic binder in the coating material serves not only to bind the slurry to the treated glass surface but further provides a porous matrix allowing transport of the cuprous halide vapors to the glass surface upon heating followed by penetration of the coating with the reducing atmosphere in order to achieve final reduction of the cuprous metal ion in the glass surface to its metal state. The sodium ions displaced from the glass surface are also retained in the coating which prevents inhibition with the desired ion exchange process. Conventional amounts of the particulated inorganic binder are employed with excess binder rendering the coating too impervious for needed gas transport to the glass surface and with too little binder not providing sufficient adherence of the dried coating material to the glass surface during the subsequent heating step.

The gaseous atmosphere is controlled when the coated glass article is heated so as to initially maintain a non-reducing condition during the time period when the cuprous ions exchange with sodium ions in the glass surface and which is followed by conversion of said gaseous atmosphere to a reducing condition for a time period sufficient to reduce the substituted copper ions in the glass surface to a metallic state. Conversion of the gaseous atmosphere in which the coated glass article is heated as previously described can be accomplished readily by conducting the heating step in a conventional lehring oven having an air or neutral gas atmosphere and wherein the coated glass article is placed on top of a metal container having considerable heat capacity by reason of sufficient mass so that a time delay will be introduced between the elevated temperature at which the lehring oven is maintained and the temperature at the bottom inner surface of said container. The coated glass article can thereby be placed as a lid on a cast iron dish with the coated surface facing the dish interior and said metal container can further contain a small quantity of coal, for example, approximately 50 grams to generate the desired localized reducing condition in a sequential manner by reason of the thermal lag attributable to initially heating the metal container. Such delayed heating of the coal to produce a reducing atmosphere is required to avoid premature conversion of the cuprous halide vapors to metallic copper before sufficient time has taken place for the cuprous ions to exchange with sodium ions in the coated glass surface. After the treated article has cooled, the coated article is cleaned in a conventional manner to remove the residual coating material.

DESCRIPTION OF THE PREFERRED EMBODIMENTS

A series of PAR 46 size borosilicate glass lenses were obtained in accordance with the present invention by carrying out the single heating step process in a conventional lehr having automatic transport means to move the treated glassware through the heating chamber. Representative staining compositions are reported in Table I below with said staining compositions being applied to the glassware as a slurry obtained by mixing the solid constituents in a liquid vehicle such as methanol.

TABLE I

| Sample | 1 | 2 | 3 | 4 | 5 |
|---|---|---|---|---|---|
| CuCl | 60.0 | 40 | 40 | 70 | 40 |
| CuSO$_4$ | 600.0 | 300 | 300 | 450 | 40 |
| CuS | 18.0 | 0 | 10 | 20 | 0 |
| Aluminosilicate Powder | 100.0 | 220 | 40 | 90 | 40 |

As can be noted from said above Table, the relative proportion of constituents in the illustrated staining compositions to obtain a particular red coloration can have a weight ratio for cuprous chloride to aluminosilicate powder from about 1:1 to 1:5.5, whereas the weight ratio for cuprous chloride to cupric sulfate can be from 1:1 to 1:10 and the weight ratio for cuprous chloride to cupric sulfide can be from 1:0 to 1:0.3. The preferred aluminosilicate powder is silliminite although other materials such as calcined clays and zirconia may be usable. The coating composition was milled in a ball mill with a sufficient quantity of methanol to produce a fluid slurry. The prepared slurry was then applied in conventional fashion by either dipping or spraying this material on the glass surface and air drying the slurry coated surface. The coated lens member was then placed on a cast iron dish having dimensions so that a reasonably tight closure of said dish resulted and the dish further contained approximately 50 grams of pulverized coal.

The coated glassware assembly was transported through a conventional gas heated air atmosphere lehr equipped with a moving metal mesh belt with said lehr having been heated to a nominal temperature range from approximately 630° C. to approximately 660° C. At a moving belt speed of approximately 18″/min., the cuprous chloride vapors generated in the coating at a temperature of approximately 500° C. permeated the glass surface for exchange with sodium ions in the glass. When the coal contained in the dish subsequently reached approximately 600° C. hydrogen and methane were liberated which converted the atmosphere within said dish from a neutral or oxidizing condition for reduction of the cuprous ions in the glass surface to elemental copper. After the stained lenses had cooled, the baked-on coating material was removed by a conventional cleaning operation to provide the final articles. Coating composition 4 produced the most favorable color results but the remaining listed compositions yielded colors meeting acceptable product specifications.

While preferred embodiments of the invention have been shown and described, various other embodiments and modifications thereof will become apparent to persons skilled in the art. For example, it is expected that other cupric salts could be substituted in the coating material. Additionally, the color and degree of penetration of the stain can depend upon the sodium content of the glass being stained as well as the thermal schedule of the heating step. Consequently, it is intended to limit the present invention only by the scope of the following claims.

What we claim as new and desire to secure by Letters Patent of the United States is:

1. A method of producing a red color stain on a borosilicate glass article utilizing only a single heating step which comprises:
   (a) coating the surface of the glass article with a slurry containing cuprous chloride, a cupric salt in sufficient amounts to retain the cuprous ion in its lower valence state and a particulate inorganic binder to form a porous matrix on the glass surface,
   (b) using the coated glass article as a closure for a metal container having sufficient mass to produce a thermal lag at the bottom inner surface of said container when heated,
   (c) adding a sufficient quantity of pulverized coal in said container to generate hydrogen and methane upon heating;
   (d) heating said closed container under non-reducing atmosphere conditions for a sufficient time period to generate cuprous chloride vapors and exchange the cuprous ions in said vapors with sodium ions in the glass surface, and
   (e) continuing said heating of the closed container without interruption to convert the non-reducing atmosphere conditions within the closed container to a reducing condition by delayed generation of hydrogen and methane for a sufficient time period to reduce the cuprous ions in the glass surface to metallic copper and produce a red stain on the underlying glass surface.

2. A method as in claim 1 wherein the cupric salt is a sulfur containing inorganic compound.

3. A method as in claim 1 wherein the cupric salt is cupric sulfate.

4. A method as in claim 1 wherein a mixture of cupric salts is employed which includes cupric sulfide.

5. A method as in claim 1 wherein the particulated inorganic binder is powdered silliminite.

* * * * *